(12) United States Patent
Levin et al.

(10) Patent No.: US 8,079,211 B2
(45) Date of Patent: Dec. 20, 2011

(54) BYPASS PURGE FOR PROTECTING AGAINST FORMATION OF REDUCTANT DEPOSITS

(75) Inventors: Michael Levin, Ann Arbor, MI (US); Jeremy Keller, LaSalle (CA); Furqan Zafar Shaikh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 491 days.

(21) Appl. No.: 12/265,862

(22) Filed: Nov. 6, 2008

(65) Prior Publication Data

US 2010/0107614 A1   May 6, 2010

(51) Int. Cl.
*F01N 3/00* (2006.01)
(52) U.S. Cl. ............. 60/286; 60/274; 60/287; 60/297; 60/301; 60/303
(58) Field of Classification Search .......... 60/274, 60/286, 287, 288, 289, 295, 297, 301, 303
See application file for complete search history.

(56) References Cited

U.S. PATENT DOCUMENTS

| | | | |
|---|---|---|---|
| 4,565,324 A | 1/1986 | Rebula et al. | |
| 4,798,330 A | 1/1989 | Mancini et al. | |
| 6,173,568 B1 * | 1/2001 | Zurbig et al. | 60/274 |
| 6,192,677 B1 | 2/2001 | Tost | |
| 6,883,311 B2 * | 4/2005 | Liu | 60/295 |
| 7,152,396 B2 * | 12/2006 | Cheng | 60/286 |
| 7,181,906 B2 * | 2/2007 | Dalla Betta et al. | 60/286 |
| 7,294,313 B2 | 11/2007 | Jacob et al. | |
| 7,509,799 B2 * | 3/2009 | Amou et al. | 60/286 |
| 7,712,307 B2 * | 5/2010 | Braun et al. | 60/297 |
| 7,730,721 B2 * | 6/2010 | Kimura et al. | 60/286 |
| 2004/0237511 A1 | 12/2004 | Ripper et al. | |
| 2005/0172615 A1 | 8/2005 | Mahr | |
| 2007/0163241 A1 | 7/2007 | Meingast et al. | |
| 2008/0022663 A1 | 1/2008 | Dodge et al. | |

* cited by examiner

*Primary Examiner* — Binh Q. Tran
(74) *Attorney, Agent, or Firm* — Julia Voutyras; Alleman Hall McCoy Russell & Tuttle LLP

(57) ABSTRACT

Systems and methods are provided for injecting liquid reductant into an engine exhaust. An example system includes a gas deflector positioned upstream of an injector where the gas deflector is configured to create a high pressure zone upstream of the deflector and a low pressure zone downstream of the deflector surrounding the injector outlet. A bypass flow passage diverts exhaust flow from the high pressure zone upstream of the deflector to allow the bypassed portion of exhaust to flow into the exhaust gas stream to form a gas shield for a liquid reductant spray from the injector. In this way, it is possible to reduce deposit formation and accumulation in the exhaust system.

19 Claims, 10 Drawing Sheets

BYPASS PURGE FOR PROTECTING AGAINST FORMATION OF REDUCTANT DEPOSITS

BACKGROUND/SUMMARY

Urea Selective Catalytic Reaction (SCR) aftertreatment technology has been chosen industry-wide for diesel engine programs to comply with the 2010 Environmental Protection Agency (EPA)'s nitrous oxide (NOx) standards. Utilizing this technology, an aqueous urea solution is often stored onboard in a urea tank and injected via a urea injector into the vehicle exhaust, where the injected urea decomposed into ammonia ($NH_3$) and carbon dioxide ($CO_2$). The ammonia generated is then absorbed onto a surface of a downstream SCR catalyst, where it reacts with the NOx in the exhaust for conversion to nitrogen and water.

Urea solution is often injected into the vehicle exhaust in form of an atomized spray. Despite the use of mixing systems to keep most droplets airborne, a combination of exhaust system space constraints and engine operating conditions may cause some urea droplets to form deposits on the surface of the urea injectors and in the immediate exhaust passage. The deposit formation process can be irreversible, causing blockage of the urea injector which leads to a degradation of NOx conversion efficiency of the SCR aftertreatment system. In some cases, the urea deposits growth in the immediate exhaust passage can cause an increase in engine back pressure and a corresponding loss of the engine power.

At low and medium exhaust flows, the larger droplets of the injected urea may end up on the pipe floor surfaces, where heavy and rapid urea deposits accumulation (see, e.g., FIG. 1) takes place. At medium and high exhaust flows, the rapidly evaporating smaller drops with progressively reduced diameter may be swept towards the ceiling surfaces, where deposits formation takes place.

The use of various mixing devices has shown successful reduction of deposits formation processes for both floor and ceiling surfaces. Furthermore, the periodic regeneration (e.g., cleaning by burning accumulated soot from the surfaces) of the diesel particulate filter, occurring approximately every 10 to 30 hours of vehicle operation, results in operation of the engine so that the exhaust gas temperature is above 600° C. for up to 12 minutes. The increased exhaust gas temperature may enable removal of urea deposits from the floor and the ceiling surfaces.

However, the inventors herein also recognize that some recessed surfaces on the inside of the exhaust pipe may still be prone to deposit formation and accumulation. One common example of this phenomenon is in the dosing injector boss. An installation of a urea dosing injector, whether at the pipe bend or within a straight section, may result in incorporation of a mounting boss holding the injector in place. Facing the exhaust gas side of the pipe, the boss may have a cavity or a recess that makes the injector position somewhat remote to minimize injector exposure to high temperatures. The flow pattern of exhaust gas near the cavity may be changed such that a recirculation of gases into the cavity may take place (see, e.g., FIG. 2). The amount of recirculation may vary with operating conditions, such as exhaust flow and temperature, urea dosing rate and ambient temperature. The exhaust gas recirculation near the cavity may increase the tendency for urea deposit formation and accumulation.

As such, systems and methods for injecting liquid reductant into an engine exhaust are provided herein to address the above mentioned issues. An example system includes an injector having an outlet for injecting liquid reductant into the exhaust gas upstream of the reduction catalytic converter, a gas deflector positioned upstream of the injector where the gas deflector is configured to create a higher pressure zone upstream of the deflector and a lower pressure zone downstream of the deflector surrounding the injector outlet, a bypass flow passage configured to divert a portion of exhaust flow from the exhaust passage, the bypass flow passage having an inlet in the higher pressure zone upstream of the deflector, and a collector in fluid communication with the bypass flow passage, the collector having one or more openings for allowing the bypassed portion of exhaust to flow out of the collector openings into the exhaust gas stream to form a gas shield for the liquid reductant spray.

In this way, the gas deflector creates the higher pressure zone upstream of the deflector where the inlet of the bypass passage is located, and the lower pressure zone downstream of the deflector where the injector outlet is located. A pressure differential is thereby formed that allows a portion of the exhaust gas flow to be diverted through the bypass flow passage to form a gas shield for the liquid reductant spray. The gas shield created may also serve to decrease recirculation of exhaust gas near the injector outlet, such as in an injector boss cavity, to reduce liquid reductant deposit formation and accumulation.

In some examples, the gas deflector comprises a flange that defines a bottom surface and a pair of side walls connected to the bottom surface, where the flange is configured to direct a portion of exhaust gas towards the inlet of the bypass flow passage. Further, the one or more openings of the collector may be circumferentially located around the injector outlet, which allows the gas shield formed to be a circular gas shield surrounding the liquid reductant spray.

In some examples, the bypass flow passage is formed between a mounting flange and the injector boss. Furthermore, a channel may be machined into the mounting flange to serve as the bypass flow passage.

In another embodiment, the above issues may be at least partially addressed by a method for injecting liquid reductant into engine exhaust gas stream, comprising: injecting liquid reductant into the exhaust gas stream via an injector having, the liquid reductant injected at an injection location upstream of a reduction catalytic converter for reducing NOx components in the exhaust gas; diverting exhaust gas from upstream of the injector through a bypass flow passage; and routing the diverted exhaust gas to the injection location where the diverted exhaust gas and the liquid reductant both enter the exhaust gas stream. In this way, it is possible to utilize exhaust gas to shield the injector, thereby reducing deposits.

The inventors herein have recognized the above issues, phenomena, and potential solutions. Further, it should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
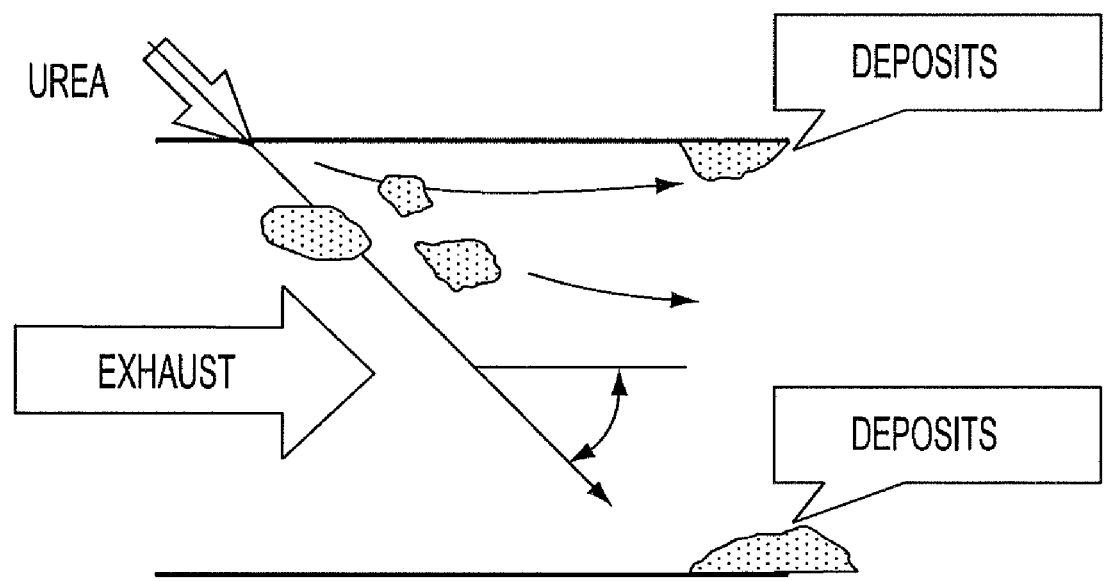
FIG. 1 shows a schematic depiction of the occurrence of urea deposit formation and accumulation in an engine exhaust passage.
Figure 2:
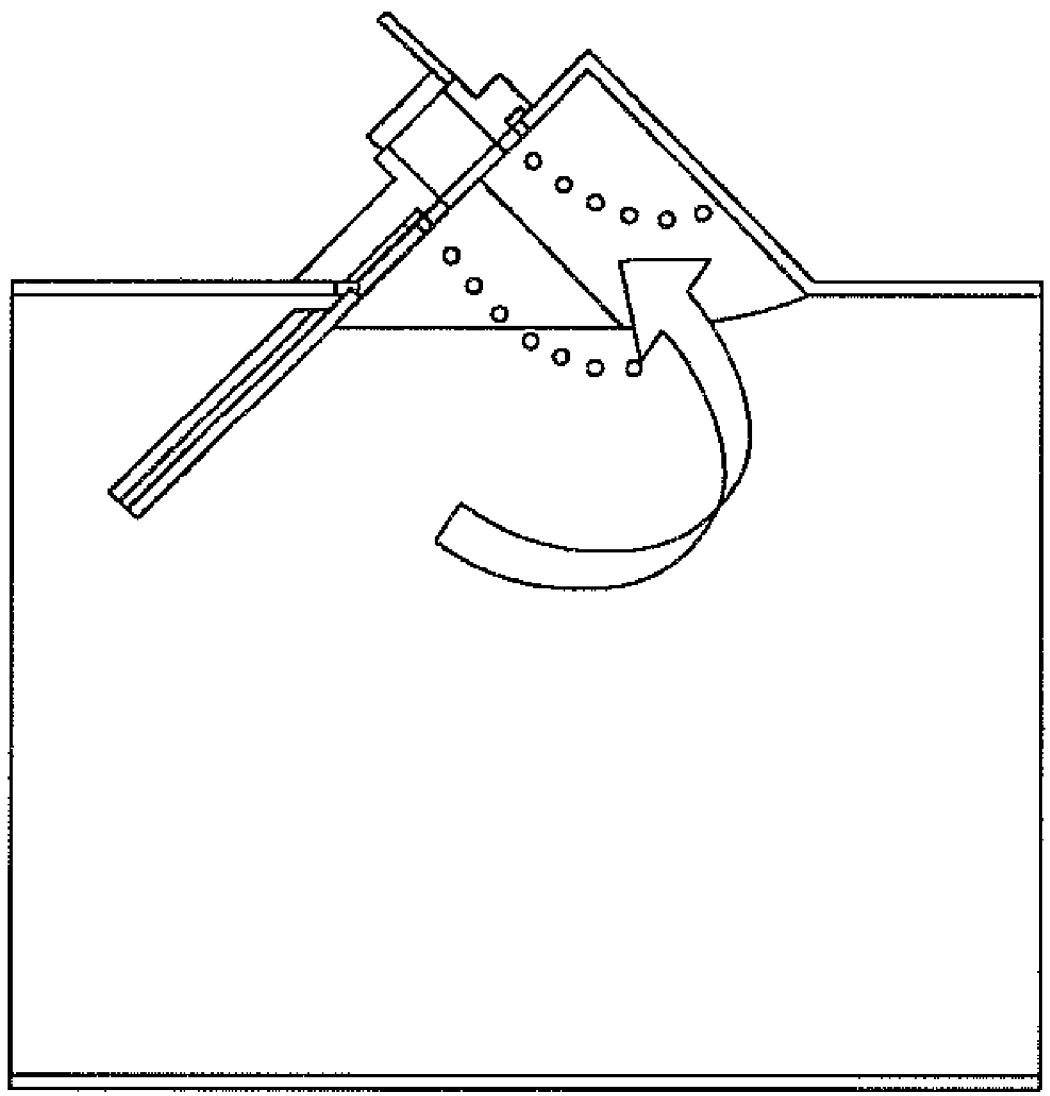
FIG. 2 shows a schematic depiction of an occurrence of exhaust gas recirculation into a mounting boss cavity.
Figure 3:
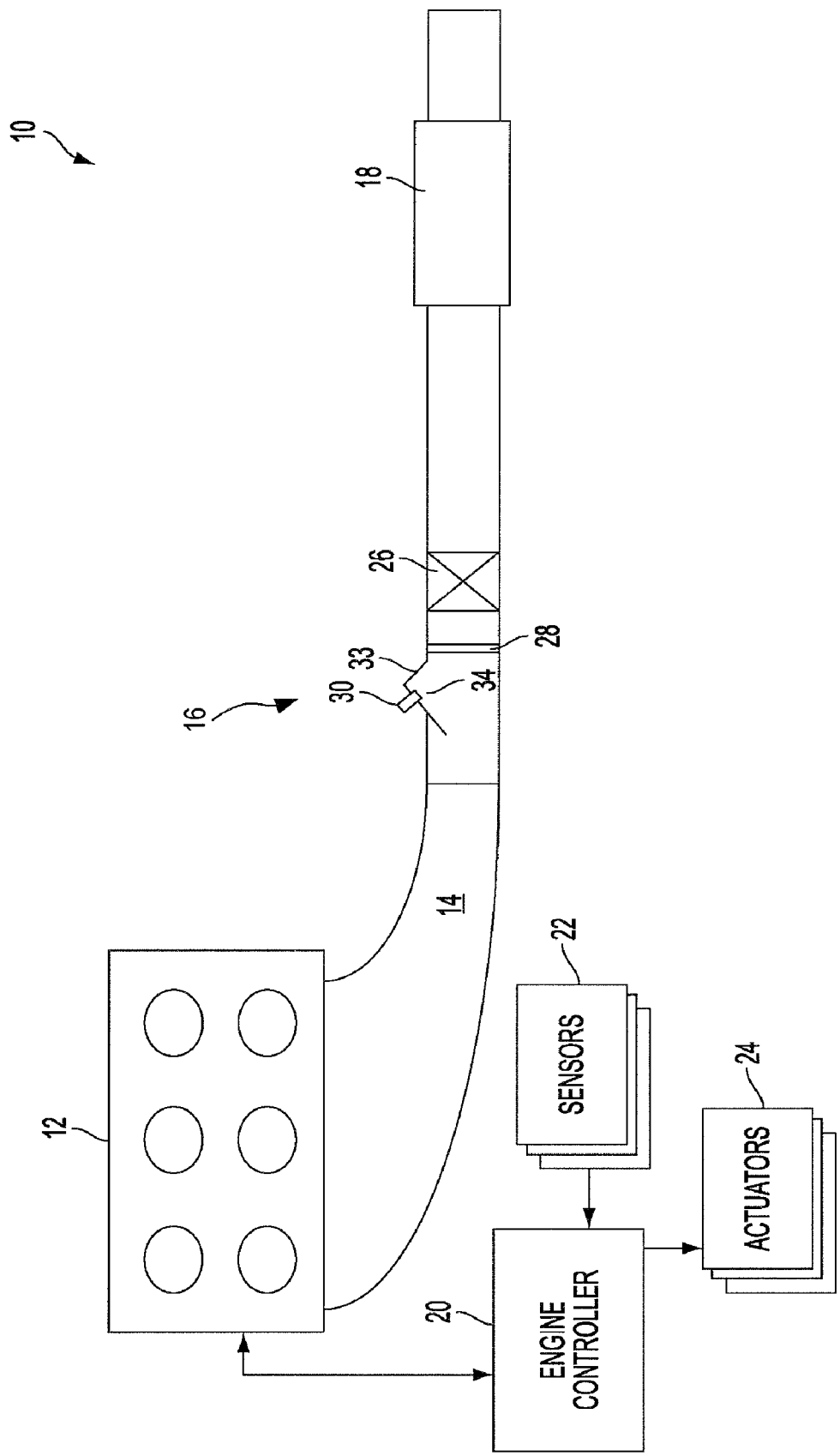
FIG. 3 shows a schematic depiction of an embodiment of an apparatus for treating engine exhaust according to the present application

FIG. 3 shows a schematic depiction of an embodiment of an apparatus 10 for treating exhaust of an engine 12 according to the present application. The apparatus 10 may include a liquid reductant injector assembly 16 coupled to an exhaust passage 14 of the engine 12. The liquid reductant injector assembly 16 may be configured to inject liquid reductant, such as liquid urea solution, into the engine exhaust.

The liquid reductant injector assembly 16 may be positioned in the exhaust passage 14 of the engine 12 at a location upstream of an emission control device 18. The emission control device 18 may for example be a SCR catalyst for removing NOx components in the engine exhaust. Details of the liquid reductant injector assembly 16 are illustrated in references to FIGS. 3-7.

The apparatus 10 may include a controller 20 coupled to various sensors 22, such as temperature sensors, oxygen sensor, NOx sensor, pressure sensor, and flow meter, for sensing various engine operating conditions. The controller 20 may also be coupled to various actuators 24, such as various engine valves and throttles, to control engine operation. It should be appreciated that the engine 12 may be any suitable engine, such as a diesel engine, that the apparatus 10 may be applied for treating engine exhaust.

Figure 8:
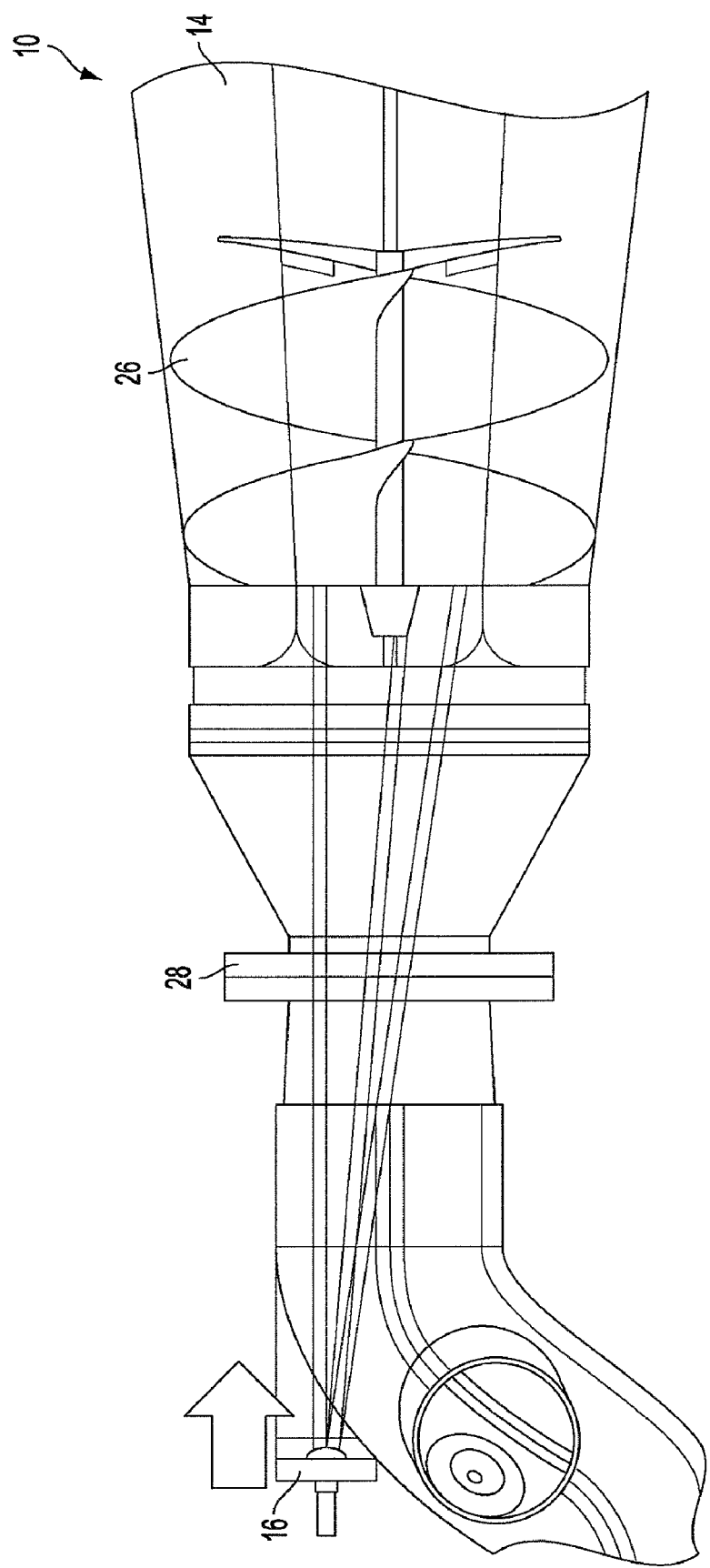
FIG. 8 shows a schematic depiction of a urea injector mounted to a mounting boss at a pipe bend.
Figure 9:
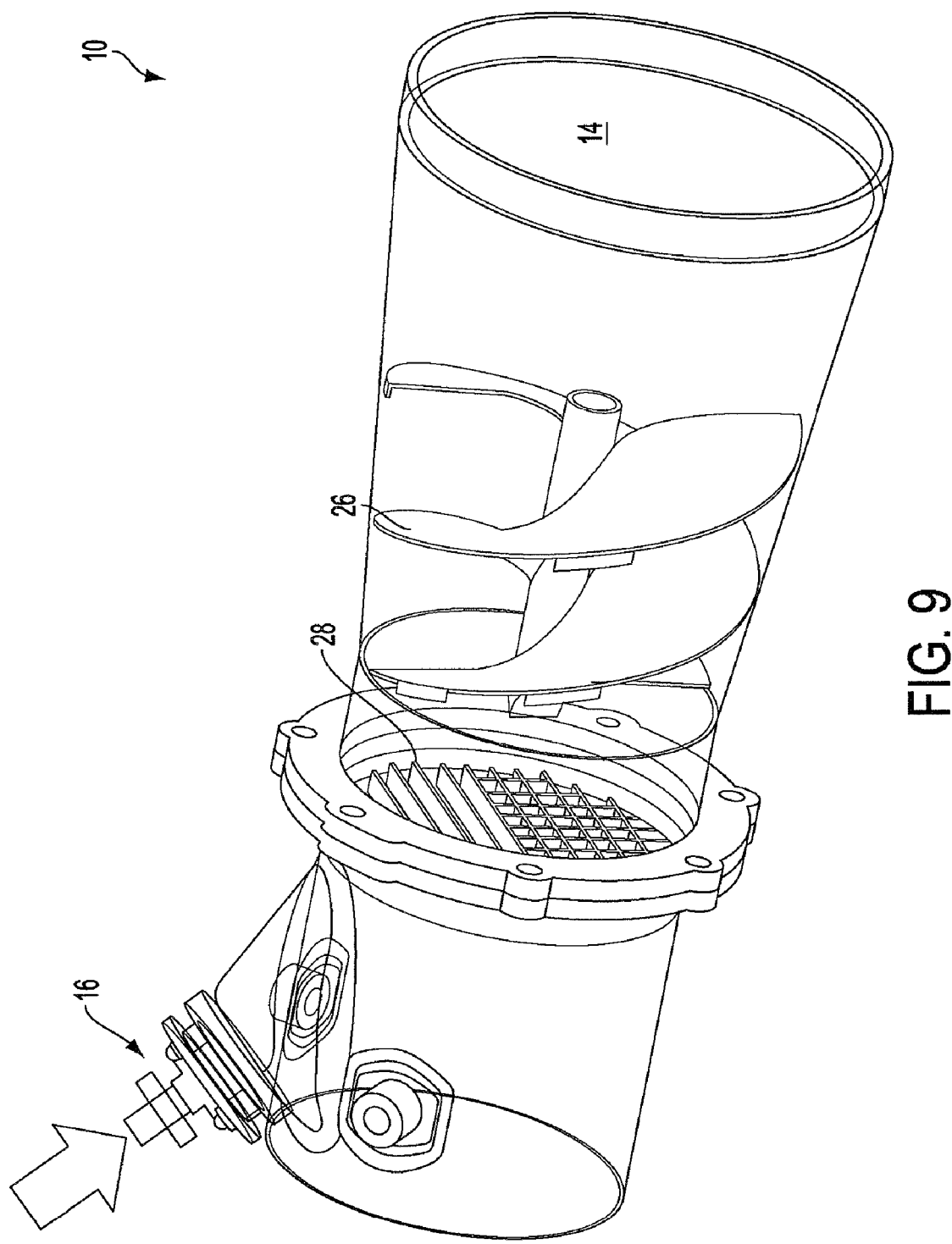
FIG. 9 shows a schematic depiction of a urea injector mounted to a mounting boss at a straight pipe section.

In some examples, the apparatus 10 may also include a mixing device 26 (as shown in FIG. 8 & 9) for mixing the liquid reductant spray with the engine exhaust. The apparatus 10 may further include a centering device 28 (as shown in FIGS. 8 & 9) for centering the liquid reductant in the exhaust passage 14 to achieve a better mixing of the liquid reductant spray with the engine exhaust. In one example, the device 28 may be a spray centering grid and/or may use angled louvers.

Figure 4:
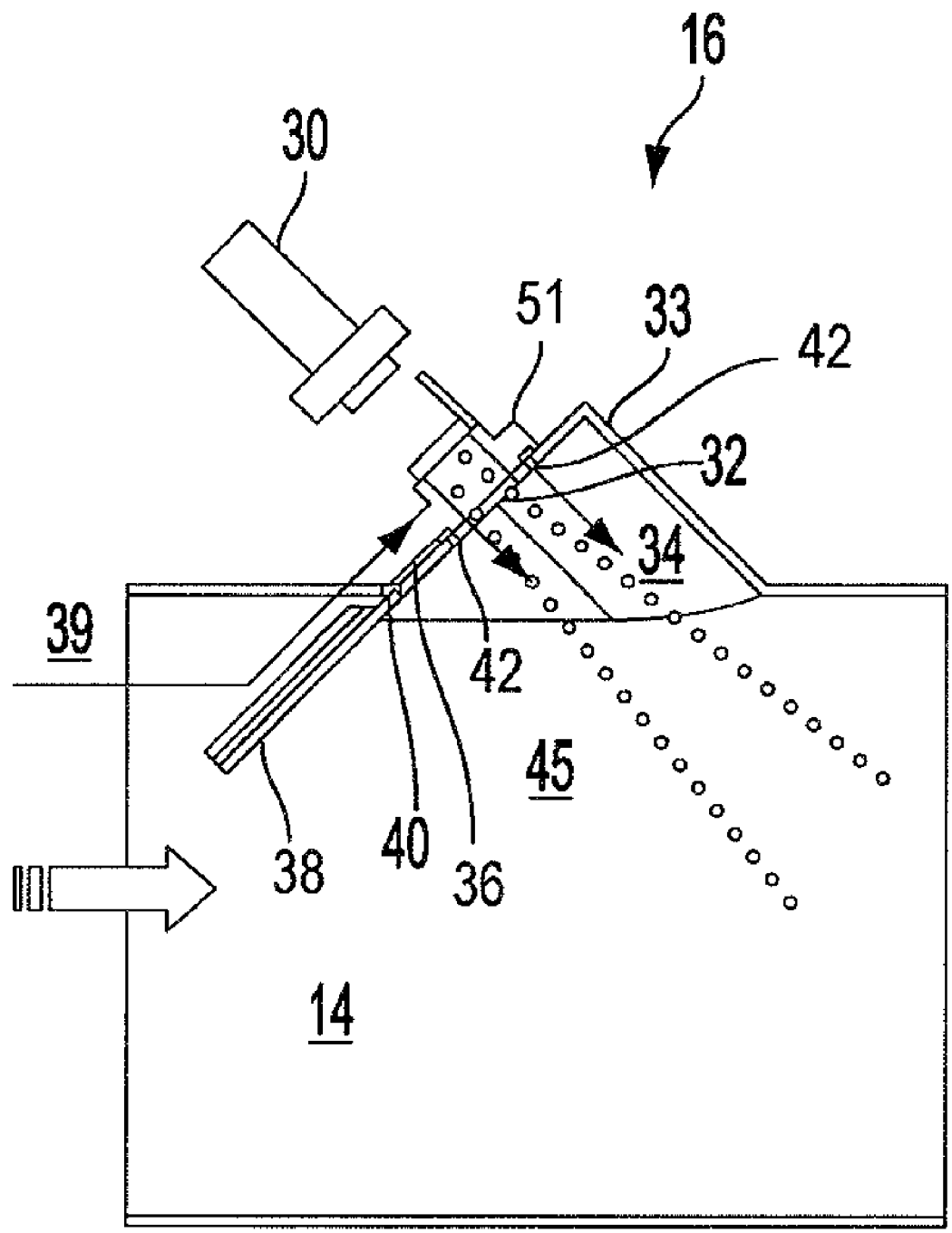
FIG. 4 shows a cross-sectional view of an embodiment of an apparatus for injecting liquid reductant into an engine exhaust that may be utilized in the apparatus of FIG. 5.
Figure 5:
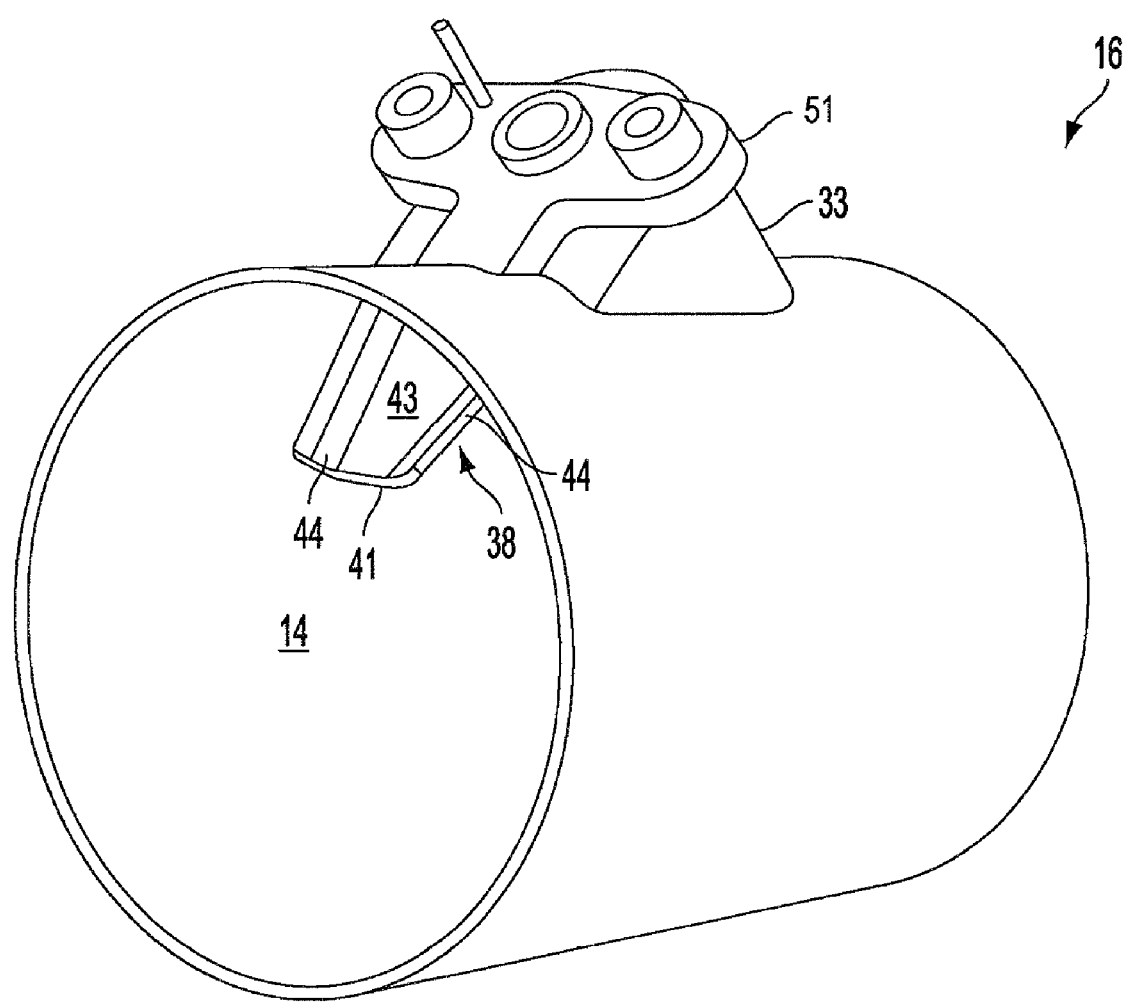
FIG. 5 shows a perspective view of the apparatus of FIG. 6.
Figure 6:
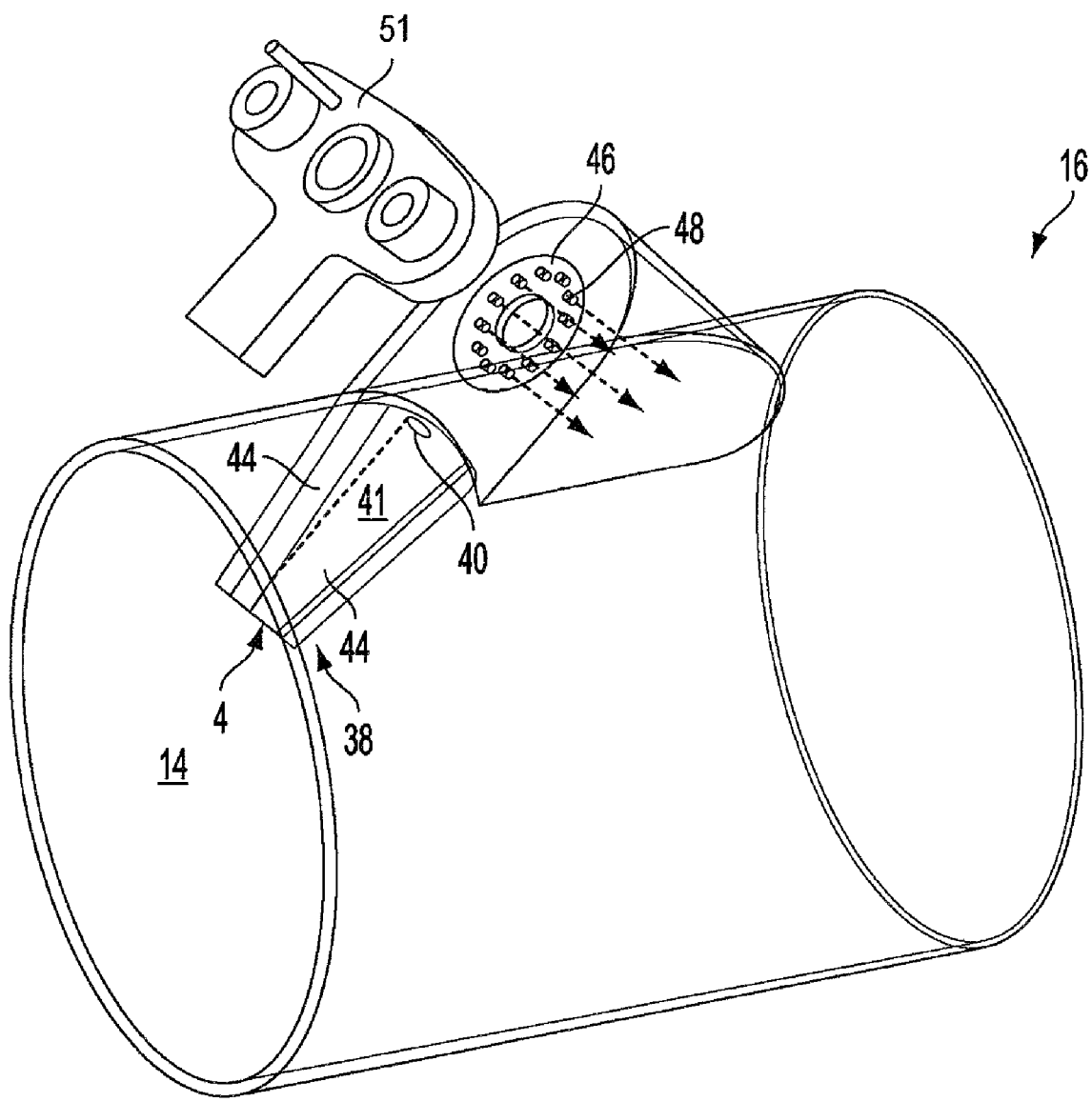
FIG. 6 shows an exploded perspective view of the apparatus of FIG. 6.
Figure 7:
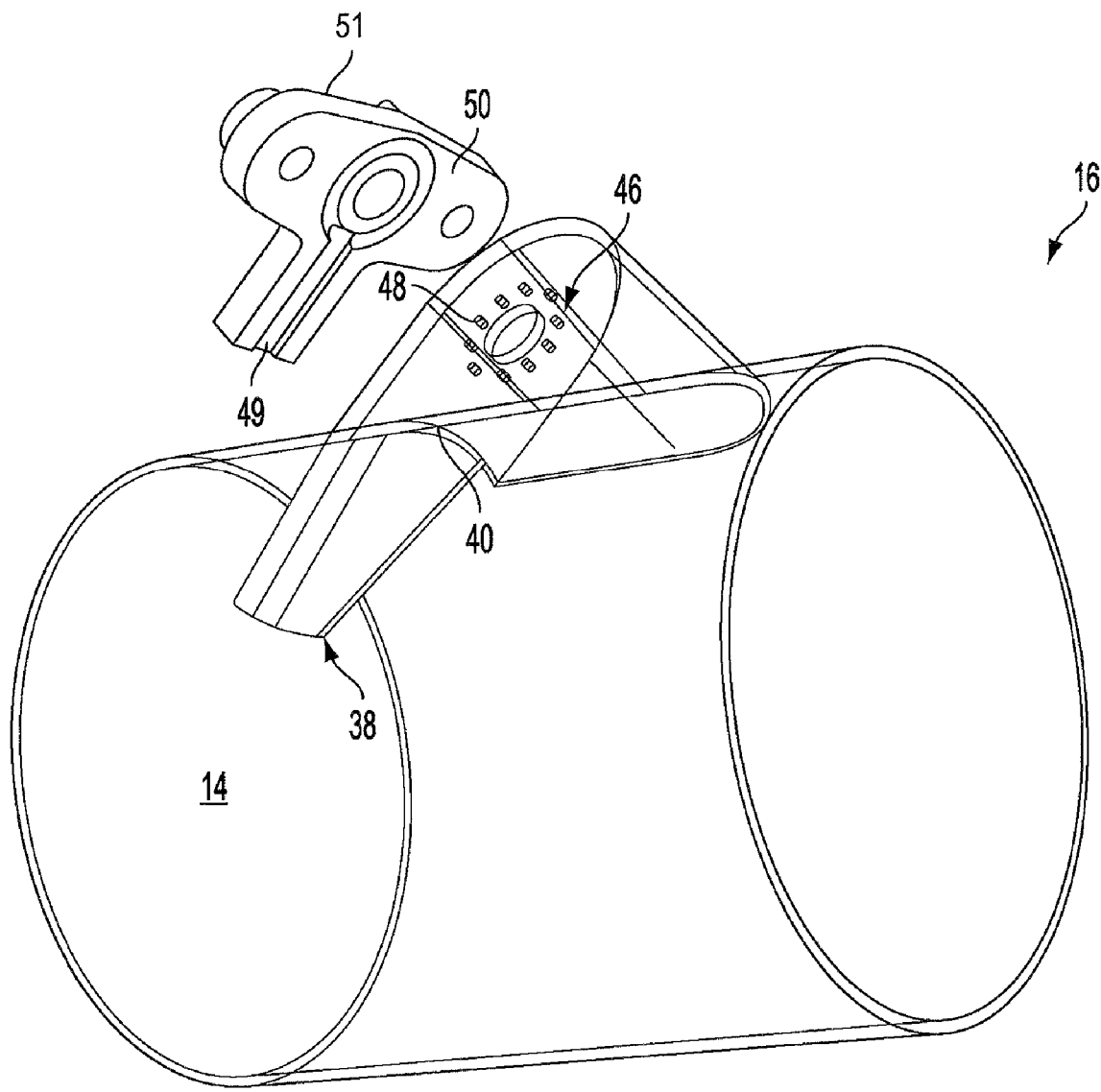
FIG. 7 shows an under side view of the mounting flange of the apparatus of FIG. 6.

FIGS. 3-7 are various views of the liquid reductant injector assembly 16 of FIG. 5. As shown in FIG. 4, the injector assembly 16 may include a liquid reductant injector 30 having an injector outlet 32 for injecting the liquid reductant, and an injector boss 33 for mounting the injector 30 to the exhaust passage 14. The injected liquid reductant may be in the form of a spray. The injector boss 33 may form a recess, in this example shown as an injector boss cavity 34, in a wall of the exhaust passage 14. The liquid reductant injector 30 may be mounted at a pipe bend or in a straight pipe section, and may be angled in various ways in the exhaust passage 14.

The injector assembly 16 may further include an exhaust gas bypass passage 36 having an inlet 40 and an outlet 42 for diverting a portion of the exhaust gas flow, and a gas deflector 38 for deflecting the exhaust gas flow from the injector boss cavity 34 and the injector outlet 32.

The gas deflector 38 may be mounted to the wall of the exhaust passage 14. The gas deflector 38 may comprise a flange 41 (see FIG. 5) configured to direct a portion of the exhaust gas towards the inlet 40 of the exhaust gas bypass passage 36. The flange 41 may include a bottom surface 43 and a pair of side walls 44. The gas deflector 38 may be angled towards the incoming exhaust flow. The gas deflector 38 may be attached to the exhaust passage 14 just upstream of the inlet 40 of the exhaust bypass passage 36.

Positioning the gas deflector 38 in the exhaust passage 14 may create a higher pressure zone 39 upstream of the gas deflector 38 relative to a lower pressure zone 45 downstream of the gas deflector 38 and surrounding the injector outlet 32 and the liquid reductant spray. The pressure differential between the higher pressure zone 39 and the lower pressure zone 45 may drive a portion of exhaust gas to enter the inlet 40 of the exhaust gas bypass passage 36 and flow through the exhaust gas bypass passage 36 to generate a gas shield around the liquid reductant spray.

The exhaust gas bypass passage 36 may also be coupled to a collector 46 at its outlet 42. The collector 46 may include one or more openings 48 for allowing the bypassed portion of exhaust gas to flow out of the collector openings 48 into the exhaust gas stream to form the gas shield (see FIG. 6). In some examples, the one or more openings 48 may include 6 to 9 openings that are circumferentially located around the injector outlet 32, so that a circular gas shield surrounding the liquid reductant spray can be formed by the bypassed exhaust gas coming out of the collector openings 48. Further, the bypass exhaust flowing out of the collector openings may be aimed in a direction substantially parallel to and aligned with the reductant injection.

In some examples, the exhaust gas bypass passage 36 may be formed between the injector boss 33 and an injector boss flange 51. A channel 49 may be machined into an underside 50 of the injector boss flange 51 before it is welded onto the injector boss 33 to serve as the pathway of the exhaust gas bypass passage 36 (see FIG. 7).

In such ways, a portion of the exhaust gas may be diverted to create a gas shield around the liquid reductant spray to prevent recirculation of the liquid reductant spray in the boss cavity and near the injector outlet 32. Thus, liquid reductant deposit formation and accumulation inside injector boss cavity 34 and in the exhaust passage 14 may be reduced.

Thus, in one example, the system may be operated to inject liquid reductant into the exhaust gas stream via the injector 30 at an injection location upstream of a reduction catalytic converter for reducing NOx components in the exhaust gas. Further, exhaust gas may be diverted away from the exhaust stream from a point upstream of the injector and then through a bypass flow passage, where the diverted exhaust gas is routed to the injection location. Then, at the injection location, the diverted exhaust gas and the liquid reductant both enter the exhaust gas stream. While this example shows the exhaust gas diverted via an angled deflector plate with respect to the exhaust passage, various other diverting approaches may be used to create a pressure difference, such as a bournulli-styled pitot tube. Further, while this example shows that the injection location includes a cavity recess formed by an angled injector boss configuration, the approach may also be applied to systems where the injector is located in a perpendicularly mounted position with respect to the exhaust passage. Finally, while this example shows a collector within the exhaust bypass having a plurality of parallel flow passages circumferentially placed around the injection location and branching off from the inlet 40, a single non-branching bypass passage may be used.

Figure 10:
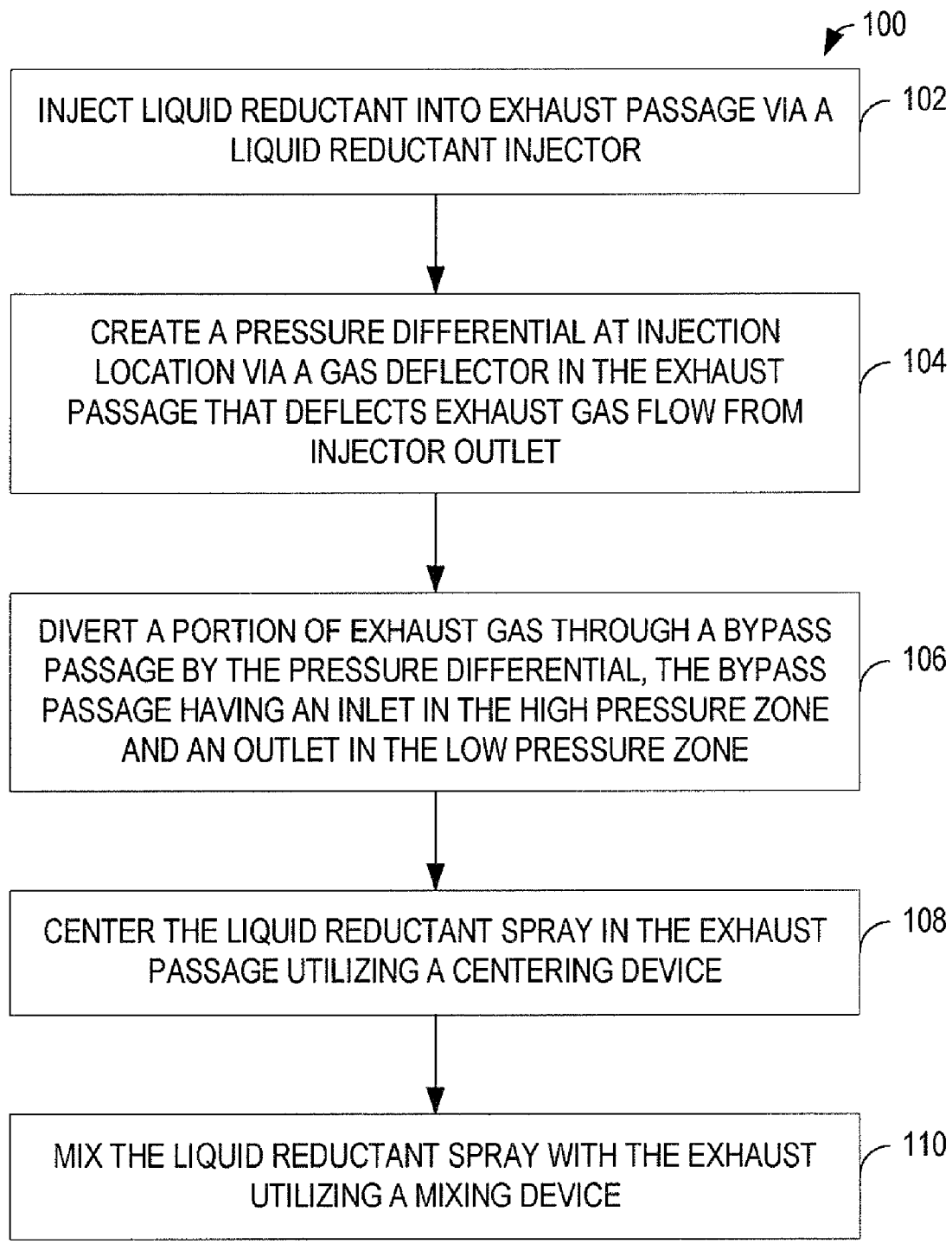
FIG. 10 is a flow chart of an example method for injecting liquid reductant into an engine exhaust according to the present application.

FIG. 10 is a flow chart of an example method 100 for injecting liquid reductant into an engine exhaust according to the present application. The method may be implemented utilizing the apparatus 10 described in references to FIGS. 5-9. The method 100 may include, at 102, using an injector having an outlet to inject liquid reductant into the exhaust gas upstream of a reduction catalytic converter for reducing NOx components in the exhaust gas.

At 104, method may include utilizing a gas deflector positioned upstream of the injector to create a high pressure zone upstream of the deflector and a low pressure zone downstream of the deflector and surrounding the injector outlet;

At 106, the method may include diverting a portion of exhaust gas through a bypass flow passage to form a gas shield for the liquid reductant spray, the bypass flow passage having an inlet in the high pressure zone.

At 108, the method may include utilizing a spray centering device to center the liquid reductant spray in the exhaust.

At 110, the method may include utilizing a mixing device to mix the liquid urea spray with the exhaust gas.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for injecting liquid reductant into an engine exhaust gas stream, comprising:
    injecting liquid reductant into the exhaust gas stream, and at an angle with respect to the exhaust gas stream, via an injector, the liquid reductant injected at an injection location upstream of a reduction catalytic converter for reducing NOx components in the exhaust gas;
    diverting exhaust gas from upstream of the injector through a bypass flow passage via an angled deflector plate, the bypass flow passage including a collector having a plurality of parallel flow passages circumferentially placed around the injection location, the injection location including a recess; and
    routing the diverted exhaust gas to the injection location, where the diverted exhaust gas and the liquid reductant both enter the exhaust gas stream.

2. An apparatus for injecting liquid reductant into an engine exhaust, comprising:
    an injector having an outlet for injecting liquid reductant into the exhaust gas upstream of the reduction catalytic converter;
    a gas deflector positioned upstream of the injector, where the gas deflector is configured to create a higher pressure zone upstream of the deflector and a lower pressure zone downstream of the deflector surrounding the injector outlet;
    a bypass flow passage configured to divert a portion of exhaust flow from the exhaust passage, the bypass flow passage having an inlet in the higher pressure zone upstream of the deflector; and
    a collector in fluid communication with the bypass flow passage, the collector having one or more openings for allowing the bypassed portion of exhaust to flow out of the collector openings into the exhaust gas stream to form a gas shield for the liquid reductant spray.

3. The apparatus of claim 2, wherein the liquid reductant is a liquid urea solution.

4. The apparatus of claim 2, wherein the collector is configured to allow the bypassed exhaust to flow out of the collector openings in a direction aligned with a direction of the liquid reductant spray.

5. The apparatus of claim 3, wherein the one or more openings of the collector are circumferentially located around the injector outlet and wherein the gas shield formed is a circular gas shield surrounding the liquid reductant spray.

6. The apparatus of claim 5, wherein the one or more openings include 6 to 9 holes circumferentially located around the injector outlet.

7. The apparatus of claim 2, wherein the bypass flow passage is formed between an injector boss and a mounting flange for mounting the injector onto a wall of the exhaust passage.

8. The apparatus of claim 7, wherein a channel is machined in the mounting flange to form the bypass flow passage.

9. The apparatus of claim 2, wherein the deflector comprises a flange attached to a wall of the exhaust passage at a location downstream of the inlet of the bypass flow passage and upstream of the injector.

10. The apparatus of claim 9, wherein the gas deflector is angled towards the exhaust gas flow.

11. The apparatus of claim 10, wherein the flange includes a bottom surface and a pair of side walls connected to the bottom surface, where the flange is configured to direct a portion of exhaust gas towards the inlet of the exhaust gas bypass passage.

12. The apparatus of claim 2, further including a mixing device positioned downstream of the injector for mixing the liquid reductant spray with the exhaust flow.

13. The apparatus of claim 12, further comprising a spray centering grid positioned downstream of the injector and upstream of the mixing device for centering the liquid reductant spray.

14. A method for injecting liquid reductant into engine exhaust, comprising:
    inject liquid reductant into the exhaust gas via an injector having an outlet, the liquid reductant injected upstream of a reduction catalytic converter for reducing NOx components in the exhaust gas;
    creating a higher pressure zone and a lower pressure zone via a gas deflector positioned upstream of the injector, the higher pressure zone upstream of the deflector and the low pressure zone downstream of the deflector and surrounding the injector outlet;

diverting a portion of exhaust gas through a bypass flow passage to form a gas shield for the liquid reductant, the bypass flow passage having an inlet in the higher pressure zone.

15. The method of claim 14, wherein liquid reductant is a liquid urea solution, and the gas shield formed is a circular gas shield that surrounds the liquid reductant spray.

16. The method of claim 14, where the gas deflector comprises a flange attached to a wall of the exhaust passage at a location downstream of the inlet of the bypass flow passage and upstream of the injector, and wherein the gas deflector is angled towards the exhaust gas flow.

17. The method of claim 16, wherein the gas deflector comprises a flange that includes a bottom surface and a pair of side walls connected to the bottom surface, where the scoop is configured to direct a portion of exhaust flow towards the inlet of the bypass flow passage.

18. The method of claim 14, further comprising mixing the liquid urea spray with the exhaust gas via a gas deflector positioned upstream of the injector.

19. An apparatus for treating engine exhaust, comprising:
a reduction catalytic converter for reducing NOx components in the exhaust gas;
an injector having an outlet for injecting the liquid urea solution;
a gas deflector positioned upstream of the injector and is configured to create a higher pressure zone upstream of the deflector and a lower pressure zone downstream of the deflector and surrounding the injector outlet;
a bypass passage configured to divert a portion of exhaust flow from the exhaust passage, the bypass flow passage having an inlet in the higher pressure zone upstream of the deflector; and
a collector in fluid communication with the bypass flow passage, the collector having one or more openings circumferentially positioned around the outlet of the injector for allowing the bypassed portion of exhaust to flow out of the collector openings into the exhaust gas stream to form a gas shield for the liquid urea solution spray.

* * * * *